July 17, 1928.
C. L. DAUN
ELECTRIC MOTOR AND DYNAMO MACHINE
Filed Jan. 26, 1928        3 Sheets-Sheet 1
1,677,433
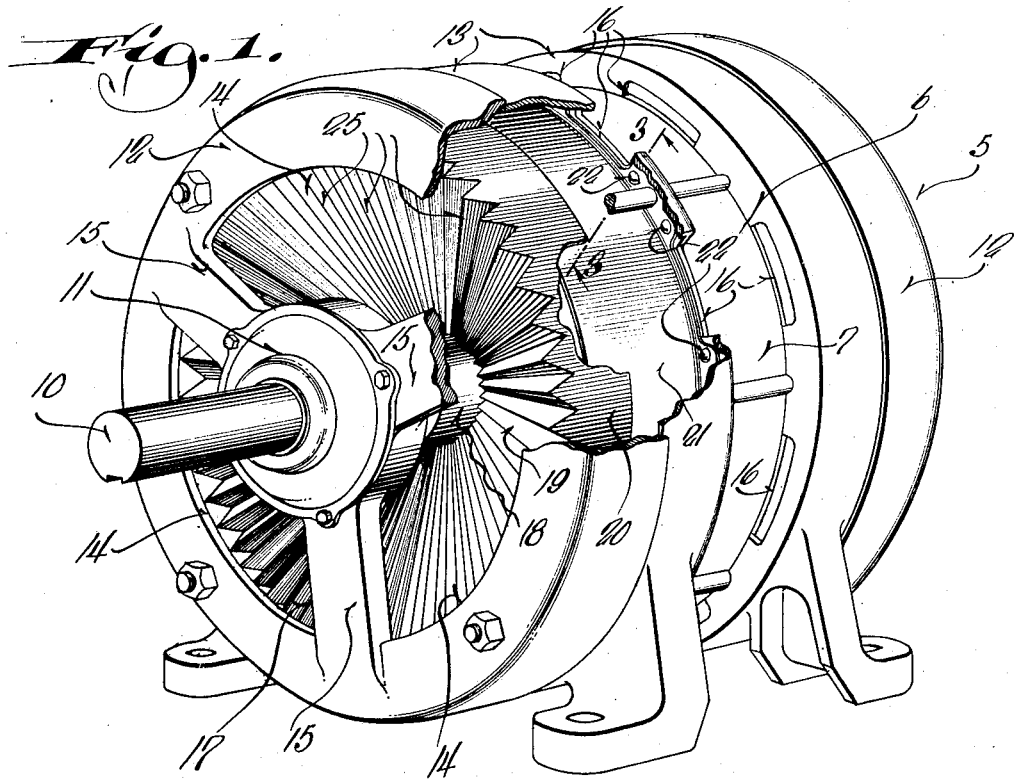
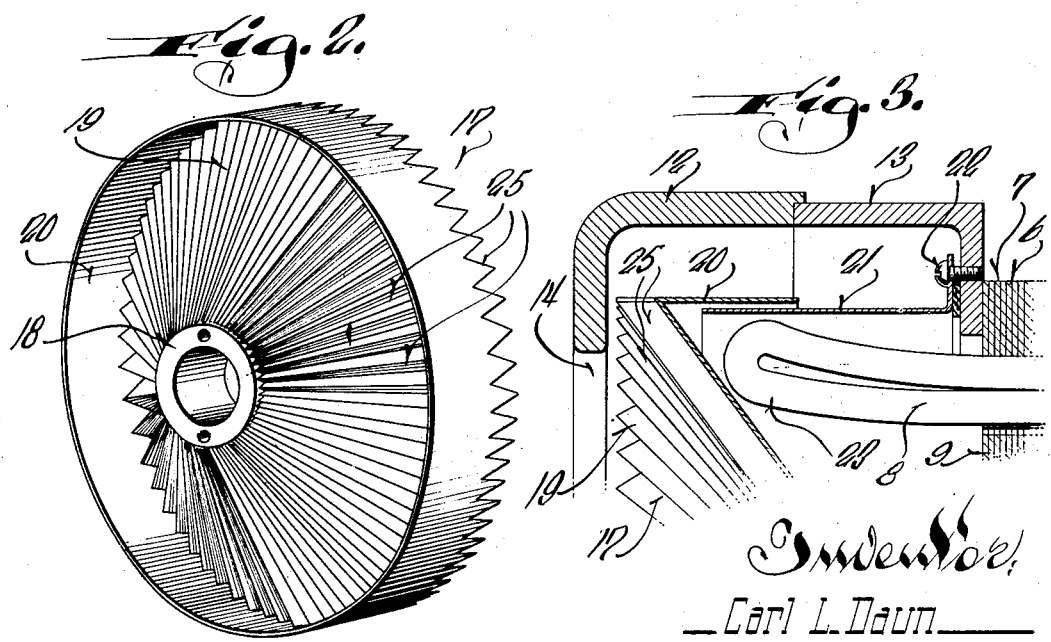
Inventor,
Carl L. Daun
By Ira Milton Jones
Attorney July 17, 1928. 1,677,433

C. L. DAUN

ELECTRIC MOTOR AND DYNAMO MACHINE

Filed Jan. 26, 1928 3 Sheets-Sheet 2

Carl L. Daun

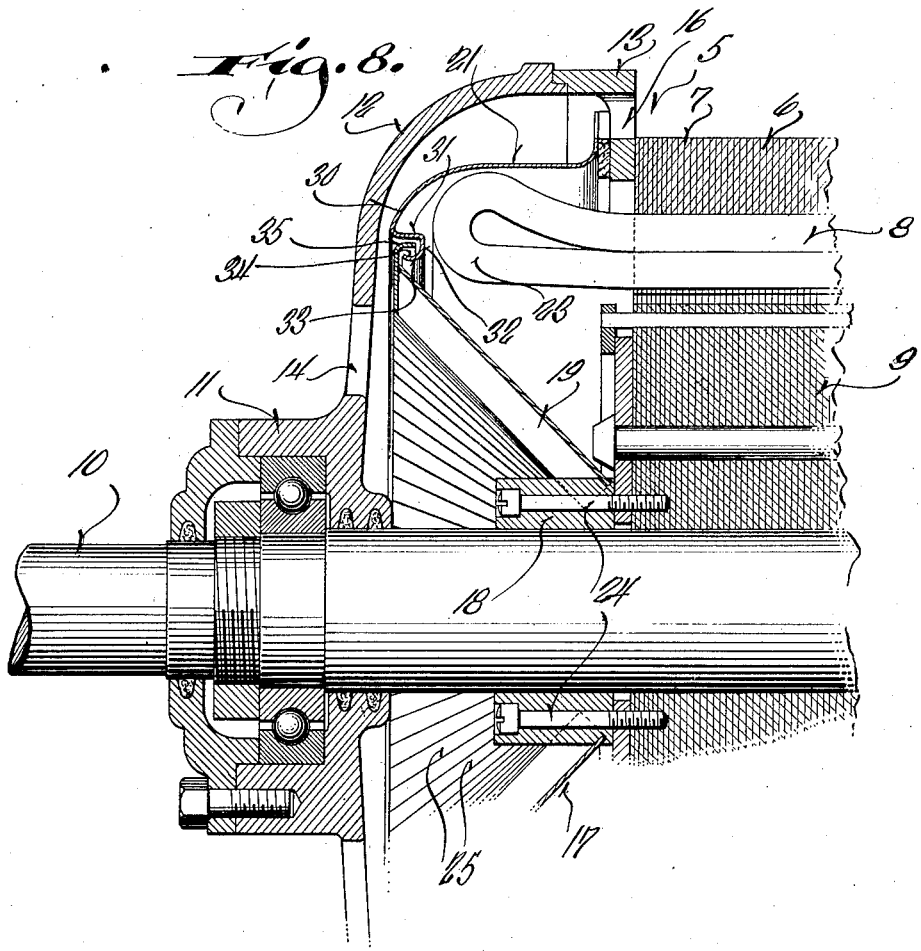

Patented July 17, 1928.

1,677,433

UNITED STATES PATENT OFFICE.

CARL L. DAUN, OF MILWAUKEE, WISCONSIN, ASSIGNOR TO SILCOCK AIRADIATOR CORPORATION, OF MILWAUKEE, WISCONSIN, A CORPORATION OF WISCONSIN.

ELECTRIC MOTOR AND DYNAMO MACHINE.

Application filed January 26, 1928. Serial No. 249,709.

This invention relates to certain new and useful improvements in electric motors and dynamo machines and has as a primary object the provision of means whereby motors now in use may be readily converted to motors of the fully closed type, or may at the time of their manufacture have their stator and rotor windings and air gap fully and completely enclosed without changing the external dimensions of the motor, without decreasing their rating, efficiency or horse-power rating per pound and without increasing the temperature rise.

In rating electric motors and dynamo machines the mass of active or electrical material governing the horse-power per pound, is directly proportionate to the ability to dissipate the heat generated, up to a point where decreased efficiency occurs; therefore, it is essential that the live parts of the motor be left clean and closed off from the surrounding atmosphere for protection against dirt and other foreign material and to increase ventilation to prevent the motor from being clogged.

Without external direct ventilation this has been accomplished only at the cost of a large decrease in horse-power per pound of both active and inactive material occasioned by the mechanical design necessary to dissipate the heat, which requires relatively liberal dimensions and the use of more active or electrical material.

Consequently users have evaded motors of the fully enclosed type with their attendant large mass for the horse-power delivery and general inefficiency and have, where possible, used the open type motor resorting to frequent cleaning and repairing so that their operation would not be too seriously impaired. This invention has as an object the provision of improved means whereby any type of open motor may be readily converted into a fully enclosed motor with its live parts totally protected against dust and dirt without in any way interfering with its efficiency or horse-power rating or its ability to dissipate heat generated during operation.

This invention has as another object the provision of an enclosing member connected with the rotor of a motor to enclose its live parts from the surrounding atmosphere, which member is so constructed as to have a large surface area over which a cooling current of air moves at high velocity whereby the heat generated by the motor is thermally conducted through said member and dissipated by the current of air passing over the same.

It is another object of this invention to provide an improved enclosing member for the live parts of an electric motor and dynamo machine which is radially fluted or pleated to provide a large surface area and a plurality of radially extending channels acting as an impeller causing a current of cooling air to be passed over the member at a high velocity.

It is a further object of this invention to provide a motor enclosing and cooling member for electric motors and dynamo machines which is formed of metal having a relatively high degree of thermal conductivity and so formed as to be positioned juxtapose and in thermal contact with the live parts of the machine whereby the heat generated thereby during operation has sufficient radiating capacity to thermally conduct heat through the member to be carried off by the cooling current of air passing over its outer surface.

And a still further object of this invention resides in the provision of a cooling and enclosing member for electric motors and dynamo machines and the method of forming the same in which the member is formed from metal having relatively high thermal conductively and fluted to provide radial passages and a large surface area and having a hub member cast onto the periphery of a central aperture in the member.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated several complete examples of the physical embodiment of my invention constructed according to the best modes I have so far devised for the practical application of the principles thereof, and in which:

Figure 1 is a perspective view of an electric motor and dynamo machine equipped with my improved invention, parts thereof being broken away and in section;

Figure 2 is a perspective view of my improved rotating cooling and enclosing member, detached from the motor and dynamo machine;

Figure 3 is an enlarged, detailed sectional view, taken through Figure 1 on the plane of the line 3—3 and illustrating the manner in which a flange on the rotating member extends over the stator enclosing sleeve to completely enclose the live parts of the machine;

Figure 8 is an enlarged fragmentary view, partly in section and partly in elevation, similar to Figure 3 illustrating a still further modification of my invention.

Figure 4:
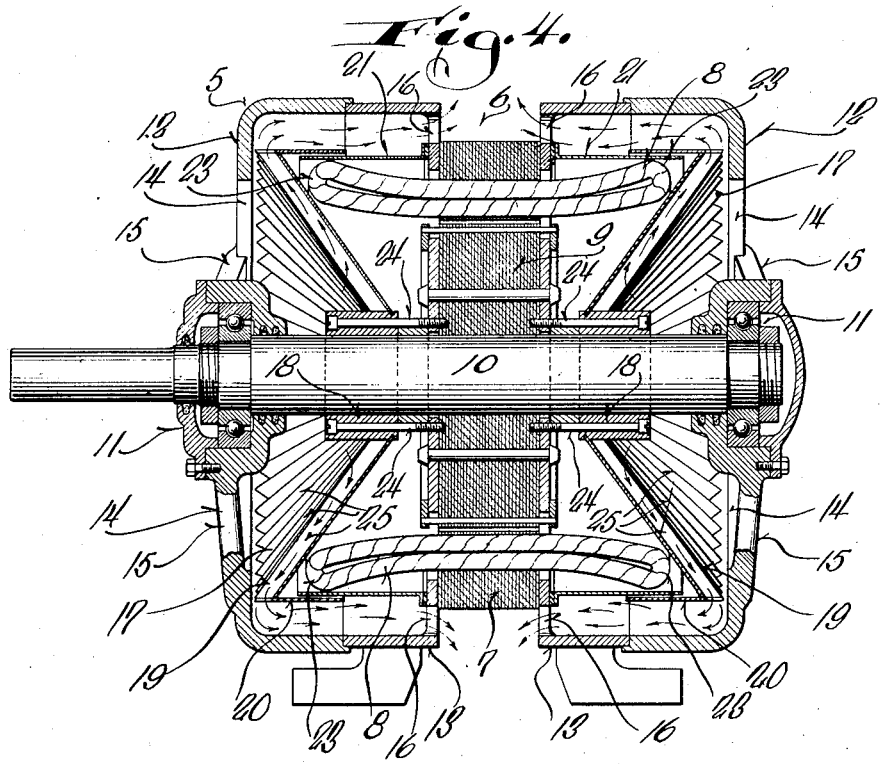
Figure 4 is a longitudinal, sectional view, with parts in elevation, taken through an electric motor and dynamo machine equipped with my invention.

Referring now more particularly to the accompanying drawings in which like numerals designate like parts throughout the several views, 5 designates an electric motor and dynamo machine of any conventional design and construction having a stator 6 including a core 7 provided with windings 8 and a rotor 9 fixed to a shaft 10 journaled in the bearing members 11 of end members 12 which, with frame members 13, enclose and hold the parts together in a unitary structure. In conventional structures, the parts of the motor are cooled by air entering the spaces 14 between the spider arms 15 supporting the bearing members 11 and being expelled through outlet openings 16 in the members 13 about the stator core 7, this being a conventional open type electric motor and dynamo machine.

Frequently the shaft 10 carries an air impeller of any conventional design in order to increase the velocity of the air passing through the machine for cooling and in the application of my improved device, the air impellers are removed and replaced by members 17 of novel design as will be later described. In that embodiment illustrated in Figures 1 to 4, the members 17 each consist of a hub portion 18 and an approximately disc shaped member 19 which is fluted or pleated radially and suitably secured to the hub with a lateral annular flange 20 extending from its periphery to overlie a sleeve or cylinder 21 secured to the frame 13, as at 22, see Figure 3, and extending outwardly to a point adjacent the outermost ends of the coils 23 of the windings 8.

The member 17 is preferably secured to the rotor by having its hub bolted or otherwise secured thereto, as at 24, and its substantially disc shaped portion is preferably formed to lie in as close a thermal contact as possible with the live parts of the motor so that the heat generated thereby may be readily thermally conducted therethrough.

The cylinders 21 and the members 17 are preferably constructed of metal having a relatively high degree of thermal conductivity and the flange 20 is soldered, welded or otherwise secured to the outer periphery of the pleated portion 19, the hub 18 being cast, welded or otherwise secured thereto, thus forming a very rigid construction, the pleats providing a series of radially extending channels 25 which impel the air at a high velocity in the direction of the arrows shown in Figure 4. A suitable clearance is provided between the flange 20 and the cylinders 21 and foreign matter is prevented from entering the live parts of the machine by the current of air as will be readily apparent. The pleats or flutes of the member 17 provide a large surface to assure a maximum of cooling area within a minimum diameter and as the member is in close proximity to the source of heat, the current of air which passes over the member causes the thorough and efficient dissipation of the heat generated by the machine in operation and thermally conducted through the member.

Figure 5:
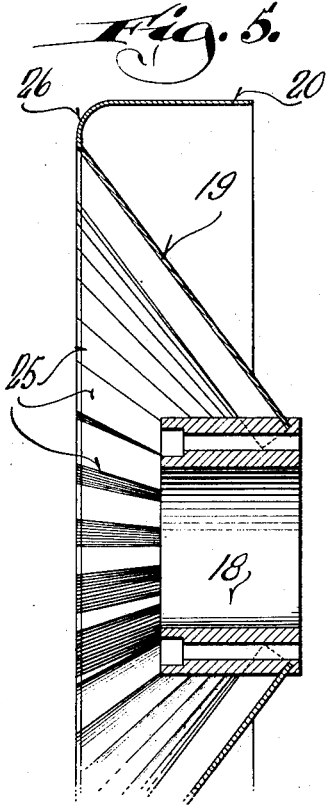
Figure 5 is an enlarged, fragmentary view, partly in section and partly in elevation, taken through a slightly modified form of rotating cooling and enclosing member.

The conventional form of cooling member 17 is as illustrated in Figures 1 to 4, inclusive, but it may be varied without departing from the spirit of the invention and in Figure 5 the flange 20 has its leading or outer peripheral edge curved inwardly, as at 26, and there connected with the portion 19.

Figure 6:
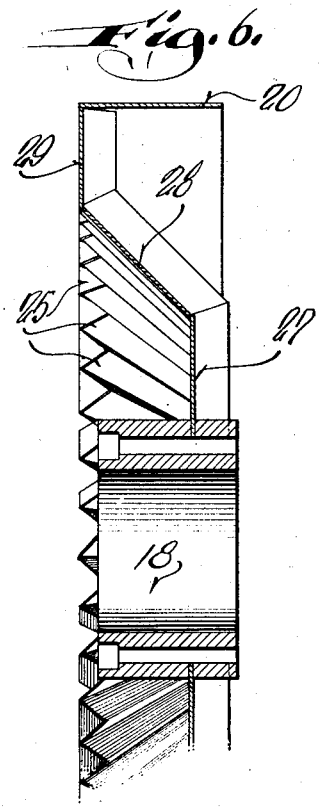
Figure 6 is a view similar to Figure 5 of a further modified form of my invention.

In Figure 6, the portion 19 extends transversely from the hub for a predetermined distance, as at 27, is then inclined outwardly and upwardly, as at 28, and again directed laterally in a parallel plane to the portion 27, as at 29, having the flange 20 connected to the periphery of the portion 29 in the manner illustrated. In this construction the portions 27, 20 and 29 are correspondingly fluted or pleated so that the radial grooves are continuous.

Figure 7:
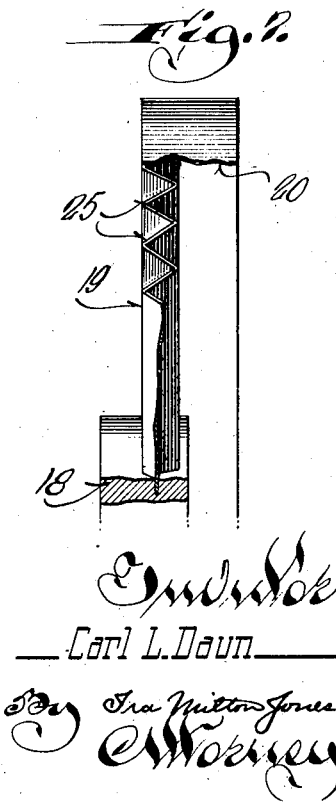
Figure 7 is a view similar to Figures 5 and 6 illustrating a still further modified form of my invention.

In Figure 7 the construction is identical with that illustrated in Figures 1 to 4, with the exception that the member is not dished inwardly and this construction is designed for installations where limited space does not make it feasible to extend the member 17 inwardly of the plane of the outer ends of the windings.

In the modification shown in Figure 8, the clearance between the ends of the windings 8 and the end pieces 12 of the machine is such as to prevent the installation of a structure as illustrated in Figure 4 and in this form of my invention the sleeve or cylinder 21 has its outer peripheral edge curved inwardly, as at 30, directed transversely, as at 31, then inwardly, as at 32 and then curved outwardly, as at 33 to provide a trough 35 into which a short lateral flange formed on the end of the member 17 in place of the flange 20, extends. The outer face of the member 17 is slightly inwardly of the outer plane of the curved portion 30 of the sleeve or cylinder 21 so that moisture and foreign matter deposited on the cylinder will fall free of the member 17 and prevent its entrance into the interior of the machine during periods of idleness.

From the foregoing description taken in connection with the accompanying drawings, it will be readily apparent to those skilled in the art to which an invention of the character described appertains, that I have provided a highly improved and novel electric motor and dynamo machine which is fully enclosed and which has the same horsepower rating per pound as motors of the open type and further that I provide improved means whereby any open type motor may be readily converted into a fully enclosed type without in any way impairing its efficiency.

What I claim as my invention is:

1. In an electric motor and dynamo machine including a rotor and a stator, means protecting the live parts of the machine from contact with extraneous matter in the atmosphere and including a pleated member rotatable with the rotor, the pleats of said member providing a relatively large air contact surface to insure the dissipation therethrough of heat generated by the machine.

2. In an electric motor and dynamo machine including a rotor and a stator, cooling means for dissipating heat generated by the machine and including an enclosing member rotatable with the rotor and having irregular surfaces to provide a large surface area over which a current of cooling air passes, said member being of substantially uniform thickness throughout and maintaining the cooling air out of contact with the live parts of the machine.

3. In an electric motor and dynamo machine including a rotor and a stator, means partly enclosing the stator and over the exterior surface of which a current of cooling air is adapted to be passed, a member rotatable with the rotor and cooperating with said means to protect the live parts of the machine from contact with extraneous matter in the cooling air, said member being fluted to produce irregular surfaces whereby relatively large surface areas are obtained over which the cooling air passes to assure the dissipation of heat generated by the machine and thermally conducted through said member.

4. In an electric motor and dynamo machine including a rotor and a stator provided with windings having coils projecting beyond the rotor, means for protecting the live parts of the machine from contact with extraneous matter in a current of cooling air and including a member rotatable with the rotor and having its medial portion formed to lie in close thermal relation to the rotor inwardly of the coil outer ends and having an irregular face to provide a large surface area over which the current of cooling air passes to assure dissipation of heat from the machine thermally conducted through said member, said member being of uniform thickness throughout the area of its irregular face.

5. In an electric motor and dynamo machine including a rotor and a stator provided with windings having coils projecting beyond the rotor, means for maintaining the live parts of the machine out of contact with extraneous matter in a current of cooling air and including a member rotatable with the rotor and having its medial portion formed to lie in close thermal relation to the rotor inwardly of the coil outer ends, said member being fluted to produce an irregular face providing a large surface area over which the current of cooling air passes to assure dissipation of heat from the machine thermally conducted through said member, and a peripheral flange directed laterally from said member and extending over the outer surface of said coils.

6. In an electric motor and dynamo machine including a rotor and a stator provided with windings having coils projecting beyond the rotor, means for maintaining the live parts of the machine out of contact with extraneous matter in a current of cooling air and including a relatively thin walled member rotatable with the rotor and having its medial portion formed to lie in close thermal relation to the rotor inwardly of the plane of the coil outer ends, said member being fluted to provide a large surface area over which the current of cooling air passes to assure dissipation of the heat from the machine thermally conducted through said member, a peripheral flange directed laterally from said member and extending over the outer surface of said coils, and a second member cooperating with said flange to enclose the live portions of the motor.

7. A cooling and protecting member for electric motors and dynamo machines, comprising a hub member, an approximately disc shaped member carried by the hub member and having radially extending pleats to provide a relatively large surface area, and a laterally directed peripheral flange carried by the disc shaped member.

8. In an electric motor and dynamo machine including a rotor and a stator, means partly enclosing the stator and a member rotatable with the rotor and having a clearance with respect to said stator enclosing means, said member being substantially thin walled with surface irregularities providing a relatively large cooling area, the member and stator enclosing means maintaining the live parts of the machine out of contact with extraneous matter in the surrounding atmosphere and the surface irregularities of the member producing a current of cooling air over its external surface and over the stator enclosing means.

9. In an electric motor and dynamo machine including a rotor and a stator, means partly enclosing the stator and a member rotatable with the rotor and having a clearance with respect to said stator enclosing means, said member being substantially thin walled with surface irregularities providing a relatively large cooling area, the member and stator enclosing means maintaining the live parts of the machine out of contact with extraneous matter in the surrounding atmosphere and the surface irregularities of the member producing a current of cooling air over its external surface and over the stator enclosing means, the velocity of the cooling air at the point of clearance between the member and the stator enclosing means preventing the entrance of extraneous matter through the clearance between the stator enclosing means and the rotor carried member.

10. In an electric motor and dynamo machine having a rotor and a stator, means for protecting the live parts of the machine from contact with extraneous matter suspended in the atmosphere surrounding the machine and for dissipating the heat generated by operation of the machine and including a member having relatively high thermal conductive characteristics, and radially extending pleats formed in said member to produce fins on both sides thereof without increasing its thickness at any point, said pleats providing a relatively large cooling surface, said member being positioned between the surrounding atmosphere and the live parts of the machine to prevent the cooling air from coming into contact with the live parts of the machine.

11. A protecting device for an electric motor and dynamo machine, comprising an imperforate fluted member, the flutes of said member forming internal and external surface irregularities to provide relatively large internal and external cooling surface areas.

12. In a protecting device for an electric motor and dynamo machine including a rotor and a stator, a member connectable with the machine rotor to turn therewith, and a fluted disc carried by said member and protecting the live parts of the machine, the flutes of the disc providing large internal and external cooling surface areas for dissipating the heat of the machine.

13. In a protecting device for an electric motor and dynamo machine including a rotor and a stator, a hub member connectable with the rotor of the machine to turn therewith, a fluted member rigid with the hub member and protecting the live parts of the machine against contact with extraneous matter in the surrounding atmosphere, and a peripheral flange extended laterally from the fluted member.

14. In a protecting device for an electric motor and dynamo machine including a rotor and a stator, a hub member connectable with the rotor of the machine to turn therewith, a fluted member rigid with the hub member, a peripheral flange extended laterally from the fluted member, and a stationary member adapted to be disposed over the stator of the machine and cooperating with the fluted member and flange whereby the live parts of the machine are protected from contact with extraneous matter in the surrounding atmosphere.

15. A protecting device for an electric motor and dynamo machine, comprising a mounting member, and a fluted substantially conical shaped member carried by the mounting member, the flutes of the second member forming internal and external surface irregularities to provide relatively large internal and external cooling surface areas.

16. A device for converting a standard open type electric motor and dynamo machine including a rotor and a stator into a fully enclosed type machine with its live parts shielded from extraneous matter in the surrounding atmosphere, and comprising means securable over one end of the live parts of the machine and including a member rotatable with the rotor and having internal and external surface irregularities and of substantially uniform thickness throughout its irregular surfaces to afford relatively large internal and external cooling surface areas.

17. A device for converting a standard open type electric motor and dynamo machine including a rotor and a stator into a fully enclosed type machine with its live parts shielded from extraneous matter in the surrounding atmosphere, and comprising means securable over one end of the live parts of the machine and including a member rotatable with the rotor and having internal and external surface irregularities to afford relatively large internal and external cooling surface areas, said member being of substantially uniform thickness throughout its irregular surfaces, and a second member adapted to be disposed over the stator and cooperating with the first member.

18. A device for converting a standard open type electric motor and dynamo machine including a rotor and a stator into a fully enclosed type machine with its live parts shielded from extraneous matter in the surrounding atmosphere, and comprising a hub member connectable with the rotor to turn therewith, and a substantially conical shaped fluted member carried by the hub member and positioned to protect the live parts of the machine, said flutes forming irregular internal and external cooling surfaces of relatively large area.

19. In an electric motor and dynamo machine including a rotor and a stator, a stationary part having an annular trough, a fluted member rotatable with the rotor and protecting the live parts of the machine from extraneous matter in the surrounding atmosphere, the flutes of said member forming internal and external surface irregularities to provide relatively large internal and external cooling areas, and an annular flange carried by the fluted member adjacent its periphery and extended into said annular trough.

20. In an electric motor and dynamo machine including a rotor and a stator having windings, the ends of which project beyond the rotor, a stationary sleeve extended over the ends of the windings and having an annular channel concentric with respect to the rotor, a fluted member rotatable with the rotor, the flutes of said member forming internal and external surface irregularities to provide relatively large internal and external cooling areas, and an annular flange carried by the fluted member and extended into the channel of the stationary sleeve whereby said sleeve and rotatable member substantially enclose the live parts of the machine.

21. In an electric motor and dynamo machine including a rotor and a stator, a stationary member, and a fluted member rotatable with the rotor, the flutes of said member forming internal and external surface irregularities to provide relatively large internal and external cooling areas, and an annular flange carried by one of said members and extended into an annular channel in the other member, whereby said members substantially enclose the live parts of the machine to protect the same from extraneous matter in the surrounding atmosphere.

In testimony whereof I have hereunto affixed my signature.

CARL L. DAUN.